(No Model.)
I. KITSEE.
SECONDARY BATTERY.
No. 443,456. Patented Dec. 23, 1890.
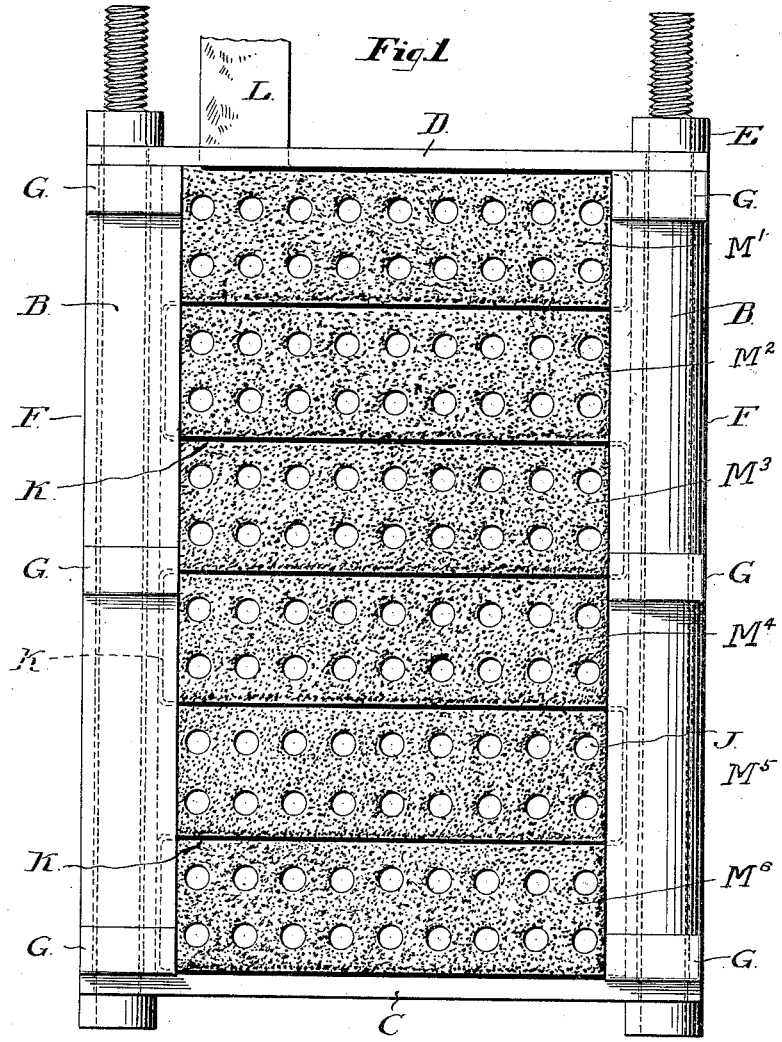
Witnesses:
F. Norman Dixon
Lewis Altmaier
Isidor Kitsee,
Inventor
By his Attorneys,
W. C. Strawbridge
J. Bonsall Taylor

UNITED STATES PATENT OFFICE.

ISIDOR KITSEE, OF CINCINNATI, OHIO, ASSIGNOR TO MAYER SULZBERGER, TRUSTEE, OF PHILADELPHIA, PENNSYLVANIA.

SECONDARY BATTERY.

SPECIFICATION forming part of Letters Patent No. 443,456, dated December 23, 1890.

Application filed February 11, 1890. Serial No. 340,045. (No model.)

*To all whom it may concern:*

Be it known that I, ISIDOR KITSEE, a citizen of the United States, residing at Cincinnati, in the county of Hamilton, and State of Ohio, have invented certain new and useful Improvements in Secondary Batteries, of which the following is a specification.

As is well known, secondary batteries are generally formed of plates of lead provided with active material usually consisting of oxide of lead. This active material is usually employed in the form of a paste placed upon a lead supporting plate.

The object of my present invention is to provide an electrode for a secondary battery in which the active material is made in the form of blocks and without a lead or other supporting device and without a conductor formed or embedded in it, a conductor of any suitable metal being employed in contact with said blocks.

In an electrode embodying my invention the active material may be formed in one block, or it may be made up of several separate blocks, in which latter case any one or more of said blocks may when necessity so requires, be removed from a containing frame if one be employed and be replaced by a new block or by new blocks.

In Letters Patent of the United States No. 400,226, and 406,916, heretofore granted to me, are shown and described electrodes for a secondary battery consisting of supporting plates unsusceptible to electrolysis or to corrosive action, and provided upon one or more of their surfaces with a suitable active material, and in an application for Letters Patent which I have prepared, Serial No. 340,044 and which bear even date herewith, I have shown and described electrodes in which the active material is contained within a frame of rubber, or of other proper material, by being properly molded or formed, and then allowed to dry.

In the drawings, Figure 1 is an elevational view of an electrode embodying my invention, and Fig. 2 is a perspective view of a block of active material corresponding in size and configuration to each of the blocks contained in the frame shown in Fig. 1.

In the drawings $M'$ $M^2$ $M^3$ $M^4$ $M^5$ $M^6$ are blocks of active material inclosed or contained in a frame which consists of two vertical hard rubber posts B B which pass through longitudinal holes in soft rubber posts or side pieces F F and through holes formed in the respective ends of hard rubber plates C and D forming the bottom and top supports of the active material. The posts B B are, at their lower ends, provided with heads, and, at their upper ends, with screw threads and nuts by which the frame and contained blocks of active material are bound together. The posts or side pieces F F are, at their inner sides, concave and within these seats the convex ends $H^2$ $H^2$ of each of the blocks of active material fit and are contained. The posts F F are provided with projections G G which serve to separate the electrodes when they are in place in the battery cell. These posts and their projections G G, may be formed or cast in one piece, or in sections, as may be desired. A conductor K formed of lead or of other suitable material, is laid between and in contact with the blocks of active material of the electrode, and, at its upper end, it passes through a proper aperture formed in the bar D of the containing frame and terminates in a lug or pole L. In case the electrode is to be used as the positive element of the battery active material may be employed which is made by mixing together red lead and powdered charcoal, in the proportion, by volume, of fifty per cent. of each of said materials, and by mixing therewith a sufficient quantity of a mixture of water and acetic acid to properly moisten the mass to enable it to be bound together, and to, when dry, form a plate or block. I have employed about one ounce of acetic acid to fifteen ounces of water, but these proportions as well as the proportions above named of red lead and charcoal powder may be varied. If the electrode is to be used as the negative element of the battery an active material may be employed which consists of litharge, and of about three per cent. by weight of acetate of lead powder. The acetate of lead powder may be made by boiling acetate of lead in dilute sulphuric acid until it melts, and by then evaporating the mass until there is a residuum of dry acetate and sulphate of lead. This mixture of acetate and sulphate of lead is ground up and mixed with litharge in a dry condition. The positive active material above described forms the subject of an application for Letters Patent, which is of even date herewith, Serial No. 340,043.

The active material above described, or any other proper active material, while moist, is to be formed or molded into blocks. If a containing frame is employed, the dimensions and configuration of the blocks are to be such that a given number of them will, when placed side by side, properly fill the frame in which they are placed to form the electrode. These blocks when dry, are to be placed, as has hereinbefore been described, in contact, in any suitable manner, with a proper conductor. These blocks may, in the course of their manufacture, be provided with holes, or perforations J J to increase the area of active material exposed to the electrolyte of the battery.

It is to be understood that containing frames of construction other than that hereinbefore described and active material other than the compounds hereinbefore referred to may be employed without departing from my invention.

Having thus described my invention, I claim and desire to secure by Letters Patent:

1. In an electrode for a secondary battery, a containing-frame formed of rubber or of other material unsusceptible to electricity or to the acid of the electrolyte and blocks of active material provided with holes or apertures, substantially as described.

2. An electrode for a secondary battery, consisting of a containing-frame formed of rubber or of other material unsusceptible to the action of electricity or to the acid of the electrolyte and containing therein two or more blocks of active material, the adjacent blocks of said series being separated by and being in contact with a conductor, substantially as set forth.

In testimony that I claim the foregoing as my invention, I have hereunto signed my name this 4th day of February, A. D. 1890.

ISIDOR KITSEE.

In presence of—
F. NORMAN DIXON,
LEWIS ALTMAIER.